United States Patent
Lui et al.

(10) Patent No.: US 9,892,353 B1
(45) Date of Patent: Feb. 13, 2018

(54) WIRELESS IDENTIFIER BASED REAL TIME ITEM MOVEMENT TRACKING

(71) Applicant: Amazon Technologies, Inc., Seattle, WA (US)

(72) Inventors: Tak Keung Joseph Lui, Bellevue, WA (US); Jeremy Dashe, Bainbridge Island, WA (US); Oleg Kantor, Kirkland, WA (US); Maju Cheruvallil Kuruvilla, Issaquah, WA (US); Alton Paul Werronen, Auburn, WA (US); Nelson Ramon, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/281,637

(22) Filed: Sep. 30, 2016

(51) Int. Cl.
*G06K 17/00* (2006.01)
*H04W 4/00* (2018.01)
*H04B 17/318* (2015.01)
*H04W 4/02* (2018.01)

(52) U.S. Cl.
CPC ....... *G06K 17/0022* (2013.01); *H04B 17/318* (2015.01); *H04W 4/008* (2013.01); *H04W 4/02* (2013.01)

(58) Field of Classification Search
CPC . G06K 17/0022; H04B 17/318; H04W 4/008; H04W 4/02
See application file for complete search history.

(56) References Cited

U.S. PATENT DOCUMENTS

| | | | |
|---|---|---|---|
| 8,280,547 B2 | 10/2012 | D'andrea et al. | |
| 9,087,314 B2 | 7/2015 | Hoffman et al. | |
| 2015/0178675 A1* | 6/2015 | Perez ................. | G06Q 10/0833 705/333 |
| 2016/0062345 A1 | 3/2016 | Stubbs et al. | |

* cited by examiner

*Primary Examiner* — Curtis Odom
(74) *Attorney, Agent, or Firm* — Knobbe Martens Olson & Bear LLP

(57) ABSTRACT

Features are disclosed for collecting wireless identifier signals such as from RFID tags to accurately determine the location of items associated with the wireless identifier. Carefully coordinating when to begin and end collection of the signals and analysis of the signals and signal characteristics (e.g., received signal strength) allow a carried item to be identified and its location determined. Additional features are described to further validate the location of the item.

20 Claims, 7 Drawing Sheets

WIRELESS IDENTIFIER BASED REAL TIME ITEM MOVEMENT TRACKING

BACKGROUND

Modern inventory systems, such as those in mail order warehouses, supply chain distribution centers, airport luggage systems, and custom-order manufacturing facilities, can include a number of complex systems, including robots, automated shelving systems, radio frequency identification (RFID), and automated scheduling and routing equipment. Many systems, for example, include robots and humans that travel to shelving systems to retrieve items, or the shelves themselves, and return them to a central location for additional processing.

BRIEF DESCRIPTION OF THE DRAWINGS

Embodiments of various inventive features will now be described with reference to the following drawings. Throughout the drawings, the examples shown may re-use reference numbers to indicate correspondence between referenced elements. The drawings are provided to illustrate example embodiments described herein and are not intended to limit the scope of the disclosure.

DETAILED DESCRIPTION

Figure 1:
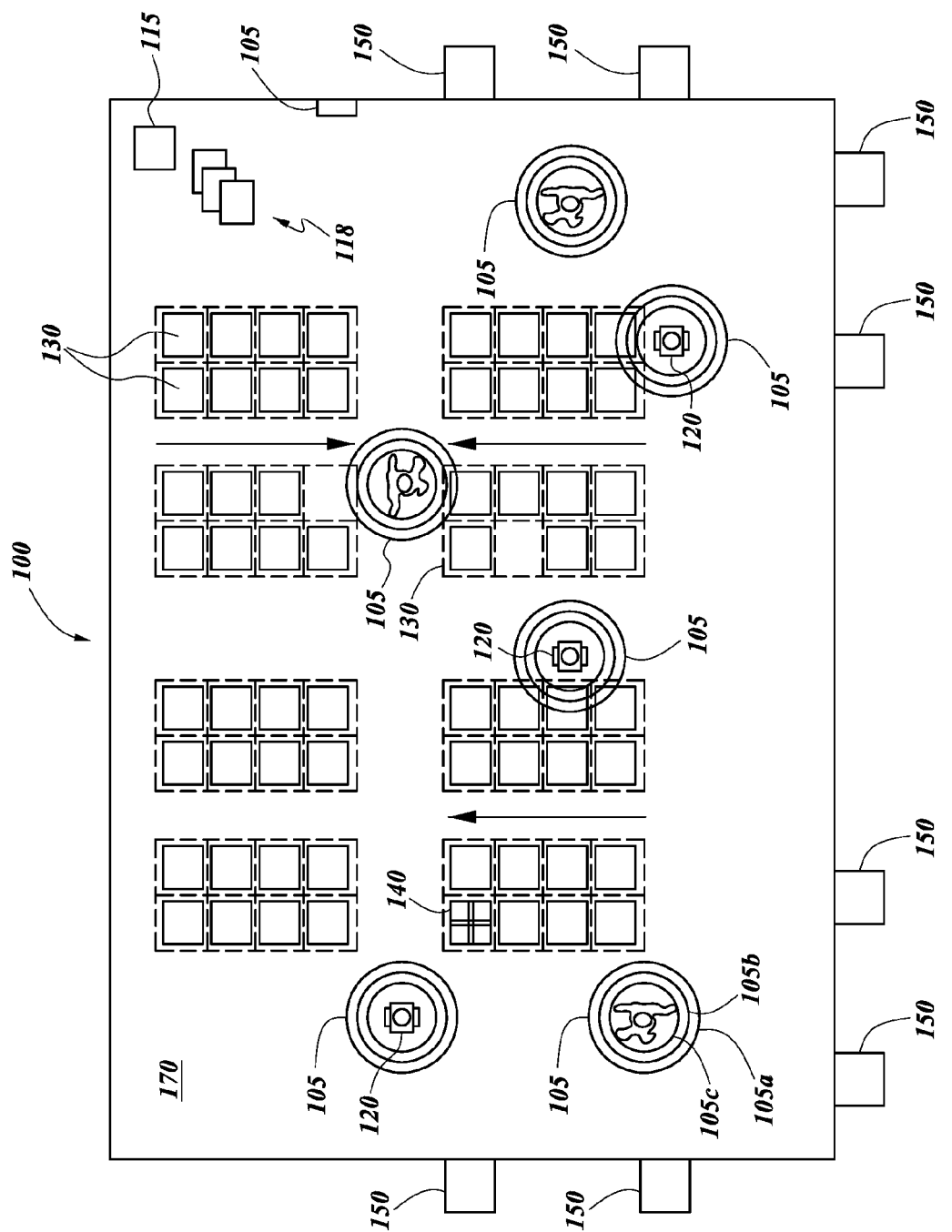
FIG. 1 is a pictorial diagram depicting an illustrative inventory system environment.

Accurately keeping track of an item as it moves through an inventory system can ensure that humans and robots find the item when it is needed. Accurately tracking an item also ensures that the item is positioned safely and in a manner that is compatible with other, nearby items. For example, an item may be moved from a shelf into a package. If the item is fragile, it may be desirable to position the item in a specific location within the package. Still further, the package may be placed on a pallet for shipping. It may be desirable to position the package in a specific position (e.g., on top) of the stack to avoid breaking the fragile item. It may also be desirable to confirm that the item is placed in a package and/or on a pallet having the proper destination. For example, the item may be retrieved for shipping to Ohio, but placed on a pallet that is being shipped to Alaska. The features described help avoid losing and/or misrouting items in inventory systems by tracking and verifying item locations as the items are handled within the inventory system.

When shipping high volumes of packages, packages may be stacked on pallets. Building a pallet involves sorting packages to the correct pallet, stacking the packages, and confirming a package is on the correct pallet. Confirming that a package is on the correct pallet usually involves bar code scanning. There may be two bar code scans, one for the package being stacked and one for the destination to which the package being stacked is being sent. The need to perform two scans to track an item in the inventory system presents two possible points of failure for maintaining an accurate location for the item.

The inventory system may include a wireless scanning device such as a WI-FI® enabled radio frequency identifier (RFID) reader device or a near field communication (NFC) transceiver, that can be worn, for example on the hand. The inventory system may include a positioning system precise enough to distinguish stacking locations such as a UWB-RTLS (Ultra-Wideband Real Time Location Service) system, and a communications network. The wireless scanning device may read wireless identifiers such as RFID tags. The wireless identifiers may be affixed to items, pallets, and other objects within the inventory system to facilitate identification and/or tracking of the items. The read may be triggered by a passively activated switch (e.g., a pressure sensor or location sensor) included in the wireless scanning device. The information read from the wireless identifier may be transmitted via the communication network to another device within the inventory system. The power used by wireless scanning device to read wireless identifiers may be optimized to read identifiers in a typical area around a human worker. For example, the power may be calibrated to allow reading wireless identifiers for items and/or packages in an area the size of a pallet. This can limit stray reads while still reading the desired item or package. The power may be specified using a configuration file for the wireless scanning device. The configuration file may include one or more power levels available for scanning. In some implementations, a power level may be selected from a list of power levels based on factors such as the item being carried, the item that will be carried, the area within the workspace, an inventory holder into which the item will be placed, an inventory holder in which the item is located, location of the wireless scanning device, or other information available to the wireless scanning device. A location system may provide position data such as via UWB-RTLS. The computer network may combine the received information to determine that the package has been placed on the correct pallet or that it has not.

FIG. 1 is a pictorial diagram depicting an illustrative inventory system environment. FIG. 1 illustrates the components of an inventory system 100 in which items may be tracked. The inventory system 100 may include a management device 115, one or more mobile drive units 120, one or more inventory holders 130, and one or more inventory stations 150. A mobile drive unit may transport one or more of the inventory holders 130 between points within a workspace 170 in response to commands communicated by the management device 115. Each inventory holder 130 may store one or more types of inventory items. As a result, the inventory system 100 is capable of moving inventory items between locations within the workspace 170 to facilitate the entry, processing, and/or removal of inventory items from the inventory system 100 and the completion of other tasks involving inventory items.

The management device 115 may assign tasks to appropriate components of the inventory system 100 and coordinate operation of the various components in completing the tasks. These tasks may relate not only to the movement and processing of inventory items, but also to the management and maintenance of the components of the inventory system 100. The management device 115 may identify components of the inventory system 100 to perform these tasks and communicate appropriate commands and/or data to the identified components to facilitate completion of these operations.

Although shown in FIG. 1 as a single, discrete component, the management device 115 may represent multiple components and may represent or include portions of the mobile drive units 120 or other elements of the inventory system 100. Interactions between a particular mobile drive unit and the management device 115 that are described may, in some embodiments, represent peer-to-peer communication between two or more of the mobile drive units 120. The components and operation of example embodiments of the management device 115 are described in U.S. patent application Ser. No. 14/472,717, filed on Aug. 29, 2014 and titled "SAFETY COMPLIANCE FOR MOBILE DRIVE UNITS," which is incorporated herein by reference in its entirety.

A mobile drive unit may be implemented as an independent, self-powered device configured to move about the workspace 170. Further examples of inventory systems and features that may be included in an inventory system are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS," each of which is incorporated herein by reference in its entirety.

The mobile drive units 120 may communicate with the management device 115 to receive information identifying selected inventory holders 130, to transmit the locations of the mobile drive units 120, or to exchange any other suitable information used by the management device 115 or the mobile drive units 120 during operation. The mobile drive units 120 may communicate with the management device 115 wirelessly and/or using wired connections between the mobile drive units 120 and the management device 115. As one example, some mobile drive units 120 may communicate with the management device 115 and/or with one another using 802.11, BLUETOOTH®, or Infrared Data Association (IrDA) standards, or any other appropriate standardized wireless communication protocol.

The inventory holders 130 may store inventory items. One or more of the inventory holders 130 may include multiple storage bins with each storage bin capable of holding one or more types of inventory items. The inventory holders 130 may include structural features to facilitate carrying, rolling, and/or otherwise moving the inventory holders 130 by mobile drive units. The inventory holder 130 may include propulsion means to supplement that provided by a mobile drive unit when moving inventory holder 130.

Inventory items 140 may hang from hooks or bars (not shown) within or on one or more of the inventory holders 130. An inventory holder may store inventory items 140 in any appropriate manner within the inventory holder and/or on the external surface of inventory holder.

A particular inventory holder 130 may be considered to be currently "storing" a particular inventory item if the inventory holder 130 currently holds one or more units of that type. As one example, the inventory system 100 may represent a warehouse facility, and inventory items may represent merchandise stored in the warehouse facility. During operation, one or more of the mobile drive units 120 may retrieve the inventory holders 130 containing one or more inventory items requested to be packed for delivery to a customer or the inventory holders 130 carrying pallets containing aggregated collections of inventory items for shipment. In some implementations, containers (e.g., boxes or packages) including completed orders may themselves represent inventory items.

The inventory system 100 may include one or more inventory stations 150. An inventory station may represent a location designated for the completion of particular tasks involving inventory items. Such tasks may include the removal of inventory items from an inventory holder, the introduction of inventory items into an inventory holder, the counting of inventory items in an inventory holder, the decomposition of inventory items (e.g., from pallet- or case-sized groups to individual inventory items), the consolidation of inventory items between inventory holders, and/or the processing or handling of inventory items in any other suitable manner.

The inventory stations 150 may represent physical locations where a particular task involving inventory items can be completed within the workspace 170. In some implementations, the inventory stations 150 may represent both the physical location and also any appropriate equipment for processing or handling inventory items, such as scanners for monitoring the flow of inventory items in and out of the inventory system 100, communication interfaces for communicating with the management device 115, and/or any other suitable item processing components.

The workspace 170 may represent an area associated with the inventory system 100 in which the mobile drive units 120 can move and/or the inventory holders 130 can be stored. For example, the workspace 170 may represent all or part of the floor of a warehouse in which the inventory system 100 operates. Although FIG. 1 shows, for the purposes of illustration, an inventory system in which the workspace 170 includes fixed, predetermined, and finite physical spaces, an inventory system may include mobile drive units and/or inventory holders that are configured to operate within a workspace that is of variable dimensions and/or an arbitrary geometry. While the workspace 170 shown in FIG. 1 is entirely enclosed in a building, the inventory system 100 may utilize one or more workspaces in which some or all of the workspaces are located outdoors, within a vehicle (such as a cargo ship), or otherwise unconstrained by any fixed structure.

The management device 115 may select appropriate components to complete particular tasks and transmit task assignment messages 118 to the selected components to trigger completion of the relevant tasks. The task assignment message 118 may include information identifying one or more tasks to be completed by at least one component of the inventory system 100. These tasks may relate to the retrieval, storage, replenishment, and counting of inventory items and/or the management of mobile drive units, inventory holders, inventory stations, and/or other components of inventory system 100. Depending on the component and the task to be completed, a particular task assignment message 118 may include information identifying locations, components, and/or actions associated with the corresponding task and/or any other appropriate information to be used by the relevant component in completing the assigned task.

The management device 115 may generate task assignment messages 118 based, in part, on inventory requests that the management device 115 receives from other components of the inventory system 100 and/or from external components in communication with the management device 115. An inventory request may identify particular operations to be completed involving inventory items stored or to be stored within the inventory system 100. For example, an inventory request may represent a shipping order specifying particular inventory items that have been purchased by a customer and that are to be retrieved from the inventory system 100 for shipment to the customer. The management device 115 may also generate task assignment messages 118 independently of such inventory requests, as part of the overall management and maintenance of the inventory system 100. For example, the management device 115 may generate one or more task assignment messages in response to the occurrence of a particular event (e.g., in response to a mobile drive unit requesting a space to park), according to a predetermined schedule (e.g., as part of a daily start-up routine), or at any appropriate time based on the configuration and characteristics of the inventory system 100. After generating one or more task assignment messages 118, the management device 115 may transmit the generated task assignment messages 118 to appropriate components for completion of the corresponding task. The relevant components may then execute their assigned tasks.

While executing a task, a mobile drive unit or human worker may carry a wireless scanning device configured to transmit and receive signals to detect wireless identifiers (e.g., RFID tags) within a scanning zone 105 near the mobile drive unit 120 or human worker. The scanning zone 105 may include an area around an entity within the workspace 170 as the entity performs a task. Some wireless scanning devices may be multi-mode wireless scanning devices. A multi-mode wireless scanning device may transmit and receive signals of varying frequencies to provide multiple scanning zones (e.g., 105a, 105b, and 105c) around an entity. For example, a wireless scanning device may include an RFID reader and a high-frequency RFID reader (HF-RFID).

The inventory system 100 may include a WI-FI/UWB-RTLS enabled RFID scanning device that can be worn on the hand, but does not interfere with grabbing, holding, and moving items or packages. The scanning of RFID tags may be triggered by pressure sensors of the reader device. For example, the reader device may include pressure sensors attached to one or more of the fingers of the device. In addition or alternatively, the real time location of the scanning device may be used to trigger scanning. For example, when the wireless scanning device is located with a scanning area, the scanning may be activated. If the device moves out of the scanning area, the scanning may be deactivated.

The wireless scanning device may include an UWB-RTLS tag that allows high accuracy detection of the position of the device. For example, when a human worker grabs a package, the pressure sensor may activate a wireless signal reader. The pressure sensor may continuously activate the wireless signal reader as long as the pressure sensor detects a load (e.g., the human worker is holding the package or item). The pressure sensor may active the wireless signal reader for a period of time. For example, the pressure sensor may activate the wireless signal reader for 5 seconds. The period of time may be a cyclical period of time (e.g., every 5 seconds) beginning when the pressure sensor detects the load and ending when the load is released. A cautionary alert may be issued on the reader device, if no wireless identifier data was detected when the pressure sensors were triggered. For example, haptic feedback, audio feedback, or visual feedback may be presented by an output component included in the reader device.

The pressure sensor, passively activated switch, or gesture detector may also cause activation of the UWB-RTLS to obtain the location of the reader device. For example, activation may be initiated when the pressure sensor, passively activated switch, or gesture detector identify that an item is lifted or moved based on one or more outputs. In some implementations, the time of the wireless identifier reads may be recorded and used by the inventory system to identify where the wireless scanning device was located using a log of positions of the reader device stored by the inventory system.

The position and wireless identifier data read may be transmitted via a network to an item tracking system. The item tracking system may look up information for the item or package based on the wireless identifier data. When a package or item is released, the wireless scanning device may activate another wireless identifier read. The position along with the additional wireless identifier read responses may be transmitted to the item tracking system. The release could also trigger a High Frequency RFID (HF-RFID) read to determine a container type in which the package was placed (e.g., bag versus pallet).

The item tracking system may use the item or package wireless identifier information to determine the location of a pallet or package where the item is supposed to be located based on information available to the item tracking system. Because the position of the pallet is known, the item tracking system may use the UWB-RTLS position when the item or package was released to determine that it was placed on the correct pallet or it was not. If the package or item was placed in a bag, the HF-RFID tag information can be used to determine the bag into which the item or package was placed. The wireless identifier information detected when the item or package is released may include information read from items or packages already on the pallet. This information can be used to generate an additional verification that the item or package is on the correct pallet.

A package may be placed on the correct pallet if the item tracking system determines that the shipping information for the package corresponds to at least a portion of the shipping information for the pallet (e.g., matching city or state information). The correctness may include confirming restrictions for the pallet (e.g., do not include fragile items, do not include hazardous items, do not include items that have age or other use limitations). If a package including a fragile, hazardous, or restricted item is placed on a pallet with a corresponding restriction, the package may be identified as incorrectly placed. The restrictions may be obtained through messaging between a wireless scanning device and the management device 115 or a catalog system (not shown) including item handling information.

While activated, the wireless signal reader may also detect other wireless identifiers in the workspace. The item tracking system may consider the UWB-RTLS information to discount reads that are made when the package is being moved, and the received signal strength indicator (RSSI) for a wireless identifier is changing. An RSSI is an indication of how strong the signal the wireless scanning device receives for a given wireless identifier. Generally speaking, the stronger signal strength identified by the RSSI, the closer the wireless identifier may be to the wireless scanning device. The RSSI for wireless identifier may be generated using a measurement of a power level for the signal received from the wireless identifier. Measurements may be collected over a period of time and used to generate a composite RSSI for the wireless identifier. For example, power levels of a series of reads for an RFID tag may be averaged and/or a mean power level for the series determined.

The RSSI of the wireless identifier for the package should not change much with motion of the package, since the package is not moving relative to the wireless scanning device. If a package is placed and released on an incorrect pallet, an alert may be output from the wireless scanning device or a presentation system near the wireless scanning device to provide a notification to the human. A correct placement may trigger a positive signal on the wireless scanning device (or nearby output device) indicating the package was placed correctly.

As an entity equipped with a wireless scanning device moves through the workspace 170, wireless identifiers that enter the scanning zone 105 may be detected. Detection may include transmitting a read message that is received by a wireless identifier and receiving a response message from the wireless identifier. Some of the wireless identifiers may be detected for a few moments while a wireless identifier included on an item carried by the entity would be detected during the time period the entity was carrying the item. Wireless identifiers detected within the scanning zone 105 may provide information. For example, an RFID tag may respond to an RFID read signal with an identifier. The identifier may be used as a look-up value to determine additional information about an item associated with the RFID tag. For example, an item identifier may be detected by a wireless scanning device. The item identifier may be used to query a catalog system for additional information about the item associated with the item identifier such as handling one or more instructions or destination locations (e.g., within the workspace 170 and/or shipping destination). Wireless identifiers may be associated with inventory holders, entities, inventory stations, or other objects (e.g., processing equipment, dolly, door, physical structure) within the inventory system 100.

To conserve resources of the wireless scanning device, the wireless scanning device may selectively activate the scanning zone 105. For example, it may be desirable to scan during the period of time when an item is being moved from a first location to a second location. The scanning may be used to identify and confirm the location of an item being moved. As discussed above, the scanning may be activated in response to active or passive detection of an interaction with an item such as being lifted. The scanning may be deactivated once a second interaction with the item or inventory holder is detected such as the item or inventory holder being released.

A mobile drive unit may activate a wireless scanning device when initiating a lift command to move an item or inventory holder from a first location to a second location. The mobile drive unit may then deactivate the wireless scanning device once the item or inventory holder is dropped at the second location. A human worker may be carrying or wearing the wireless scanning device. In one implementation, the wireless scanning device may be included in or affixed to a wearable item such as a glove, a bracelet, or a hat.

Figure 2A:
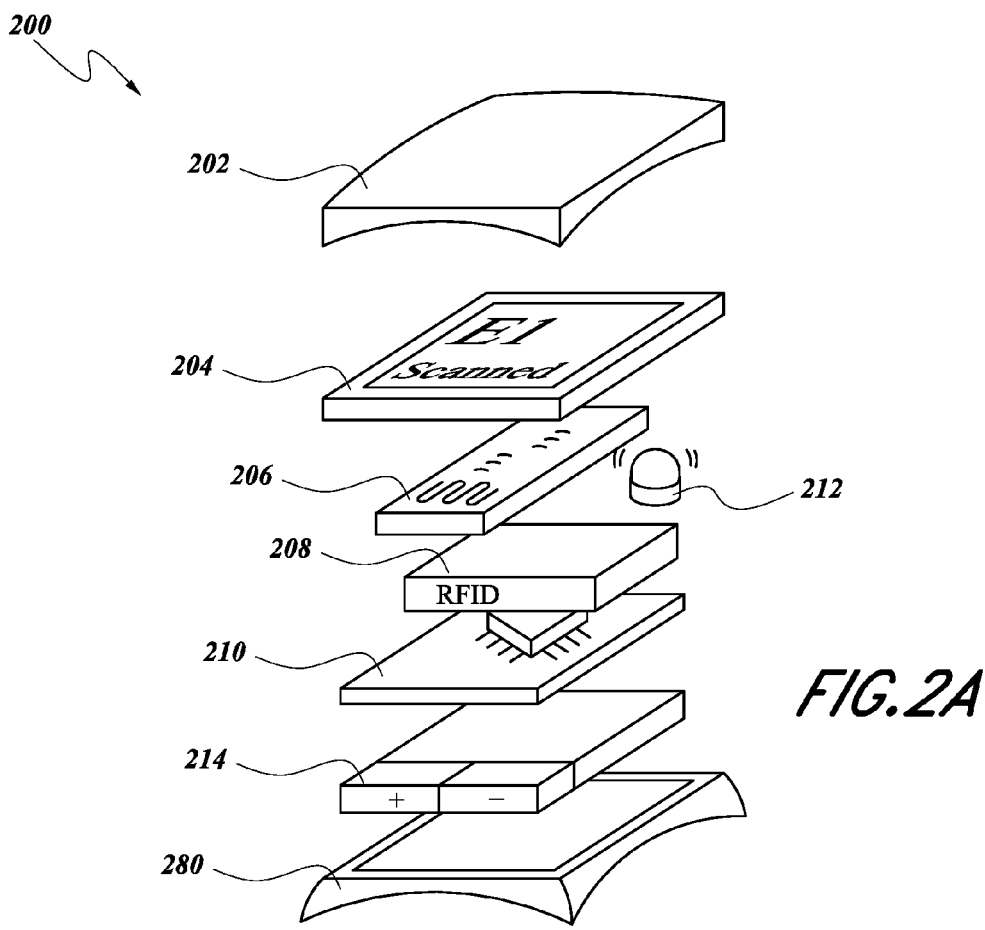
FIG. 2A is a pictorial diagram of an example wireless scanning device.

FIG. 2A is a pictorial diagram of an example wireless scanning device. The wireless scanning device 200 may include a top cover 202 and a bottom cover 280. When the top cover 202 joins with the bottom cover 280, an enclosed chamber may be formed. The enclosed chamber may include additional elements to allow the wireless scanning device 200 to read wireless identifiers. The top cover 202 may be formed of a shock resistant material to protect the elements of the wireless scanning device 200.

As shown in FIG. 2A, the wireless scanning device 200 may include a display 204. The display 204 may be implemented as a matrix display, light-emitting diode (LED) display, organic light-emitting diode (OLED) display, or other display component for presenting graphic information. The top cover 202 may be transparent or semi-transparent to allow viewing of information shown on the display 204.

The wireless scanning device 200 may include a wireless communication module 206. The wireless communication module 206 may include the hardware elements to allow the wireless scanning device 200 to transmit and receive wireless communications with other devices in the inventory system such as the management device 115 or item tracking system. The wireless communication module 206 may include one or more of a BLUETOOTH compatible transceiver, a WI-FI compatible transceiver, a mesh radio transceiver, cellular transceiver, or other wireless transceiver.

A wireless scanning module 208 may also be included in the wireless scanning device 200. The wireless scanning module 208 may include hardware elements to allow the wireless scanning device 200 to read wireless identifiers such as RFID tags or NFC data. The wireless scanning module 208 may include a RFID transceiver, NFC transceiver, or other wireless scanning transceiver. The wireless scanning module 208 may be dynamically tunable to allow the transceiver to send or receive specified frequencies. For example, the RFID transceiver may operate in a low frequency mode and a high frequency mode to scan different distances and/or types of RFID tags. In some implementations, separate low and high frequency transceivers may be included in the wireless scanning module. The wireless scanning module 208 may include one or more RFID readers such as those commercially available from ID-Innovations of Canningvale Australia (e.g., model numbers ID-3/12/20Up, ID-3/12/20LA-SA, ID-3/12/20LA-HE, ID-3/12/20LA-ISO, ID-3/12/20LA, ID-20-MF7, ID-3/12/20LA-LP, ID-0, ID-2, ID-10, ID-12, ID-20, or similar). As described in further detail below, such as with reference to FIG. 4, the frequency can be adjusted during item tracking to improve the accuracy of the item tracking.

The wireless scanning device 200 may include a microcontroller 210. The microcontroller 210 may coordinate the functions of the elements included in the wireless scanning device 200. For example, the microcontroller 210 may adjust the state of the wireless scanning module 208 (e.g., on/off, frequency, etc.). The microcontroller 210 may provide information for presentation via the display 204. For example, the microcontroller 210 may cause the display to present an output message upon activation of the wireless scanning module 208 or another element of the wireless scanning device 200. The message may indicate that the wireless scanning module 208 or other element of the wireless scanning device 200 has been activated. The message may include an identification of a wireless identifier successfully scanned. The microcontroller 210 may activate a location service (e.g., GPS or UWB-RTLS) to receive a current location for the wireless scanning device 200. The location information received may be used to activate/deactivate features of the wireless scanning device 200. For example, the type of wireless identifiers may be specific to a location or area within a workspace. Accordingly, the wireless scanning device 200 may determine its location and selectively control the wireless scanning module 208 to scan for wireless identifiers located in the same area as the wireless scanning device 200. The types and locations of wireless identifiers may be specified in memory, a wireless scanning configuration, or retrieved via messaging such as from a management device.

In some implementations, the microcontroller 210 may provide information to other output devices included in the wireless scanning device 200. For example, the wireless scanning device 200 may include a vibrating motor 212. The vibrating motor 212 may be driven by messages transmitted from the microcontroller 210 to provide haptic feedback. The message may indicate one or more of a speed or a duration for driving the vibrating motor 212. Using different speeds and/or durations, haptic feedback patterns may be generated to provide different feedback "messages." For example, a repetitive buzz may be associated with an error while a short, firm buzz may be associated with positive feedback. Other output devices that may be included in the wireless scanning device 200 and driven by the microcontroller 210 include audio output (e.g., sound or tone playback) or lighting elements (e.g., an LED that flashes different colors). The output device may include a heads-up display or other augmented reality device in communication with the microcontroller 210 and configured to present output based on messages received from the microcontroller 210.

Example implementations of the microcontroller 210 include the ARDUINO® boards commercially available from Arduino, LLC of Cambridge, Mass. Other examples of microcontrollers are offered by STMicroelectronics and Texas Instruments. The microcontroller 210 may include memory for storing instructions to coordinate the elements included in the wireless scanning device 200. The memory may also store information collected by the wireless scanning device 200 such as wireless identifiers read by the wireless scanning module 208. The wireless scanning device 200 may include alternate or additional memory in data communication with the microcontroller 210.

The wireless scanning device 200 may include a power source such as a battery 214. The battery 214 may be a rechargeable battery. In some implementations, the battery 214 is inductively charged or is charged using an external power source (not shown) such as via an electric wire or solar cell.

The elements included between the top cover 202 and the bottom cover 280 may be coupled by a bus (not shown). The bus may be a data bus, communication bus, power bus, or other bus mechanism to enable the various components of the wireless scanning device 200 to exchange resources (e.g., power) and/or information.

Figure 2B:
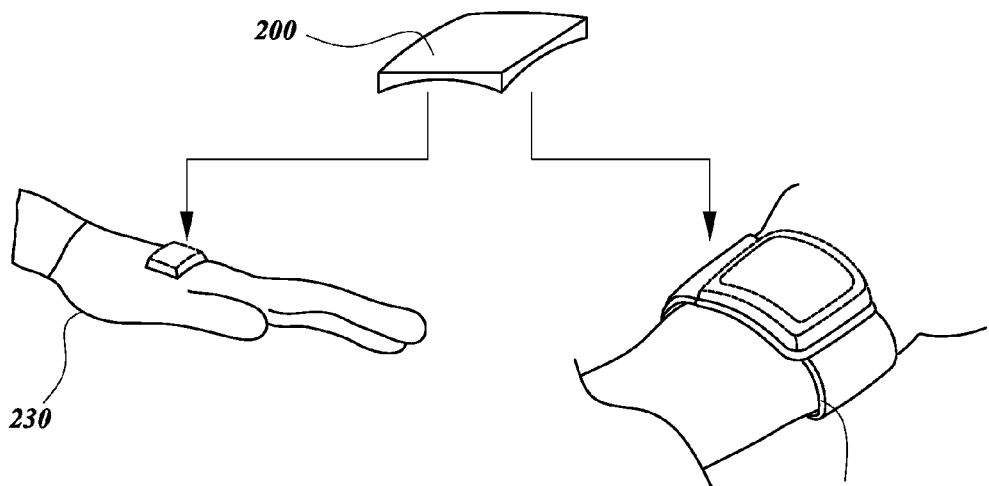
FIG. 2B is a pictorial diagram of example wearable items that may include the wireless scanning device of FIG. 2A.

FIG. 2B is a pictorial diagram of example wearable items that may include the wireless scanning device of FIG. 2A. FIG. 2B shows examples of the wireless scanning device 200 as mounted to a glove 230 and a bracelet 240. It will be understood that the wireless scanning device 200 can be integrated with other wearable items such as a hat, shirt, pants, or belt, to name a few. The wireless scanning device 200 may be integrated with another computing device such as a tablet computer, laptop computer, smartphone, scanner, or other equipment used in the inventory system. The wireless scanning device 200 may be included in non-human equipment such as a mobile drive unit. In such implementations, some feedback elements such as a display may be omitted.

The mounting of the wireless scanning device 200 on the glove 230 or the bracelet 240 may be a physical mounting. In such implementations, the wireless scanning device 200 is physically coupled with the wearable item. The physical coupling may include VELCRO® attachment, a snap-in/snap-out attachment, an adhesive attachment, or other similar structural coupling. In some implementations, the wireless scanning device 200 may include conductive coupling with the wearable item. For example, if the fingertips of the glove 230 include passive switch terminals that are activated when the tips are brought together, the passive switch may be coupled with the wireless scanning device 200 to allow the wireless scanning device 200 to receive information from the switch. Another example conductive coupling may be with an antenna included in the glove 230 or the bracelet 240. Including an antenna in the wearable item that can be coupled with the wireless scanning device 200 can increase the ability of the wireless scanning device 200 to transmit and receive wireless signals. This may also allow individual users to use their own equipment such as a set of gloves or wristbands.

Whether associated with a human or a robotic entity, as the wireless scanning device 200 moves through the workspace 170, the wireless scanning device 200 may activate the wireless scanning module 208 to detect wireless identifiers. The wireless scanning module 208 may identify a frequency to emit, transmit one or more signals of the identified frequency, and receive a response signal. The response signals may include information such as an item identifier or unique identifier for the wireless identifier that can be used to look up an item identifier such as from an item tracking system. Characteristics of the response signals may also be used to analyze the response signals. For example, the strength of the response signal may be used to generate a received signal strength indicator value for the response signal. The phase of the response signal may be another characteristic used for analysis. The response signals and/or characteristics of the response signals may be stored in memory, such as a memory coupled with the wireless scanning module 208 and/or the microcontroller 210. The stored information may be analyzed to accurately identify the location of items associated with the detected wireless indicators.

Figure 3:
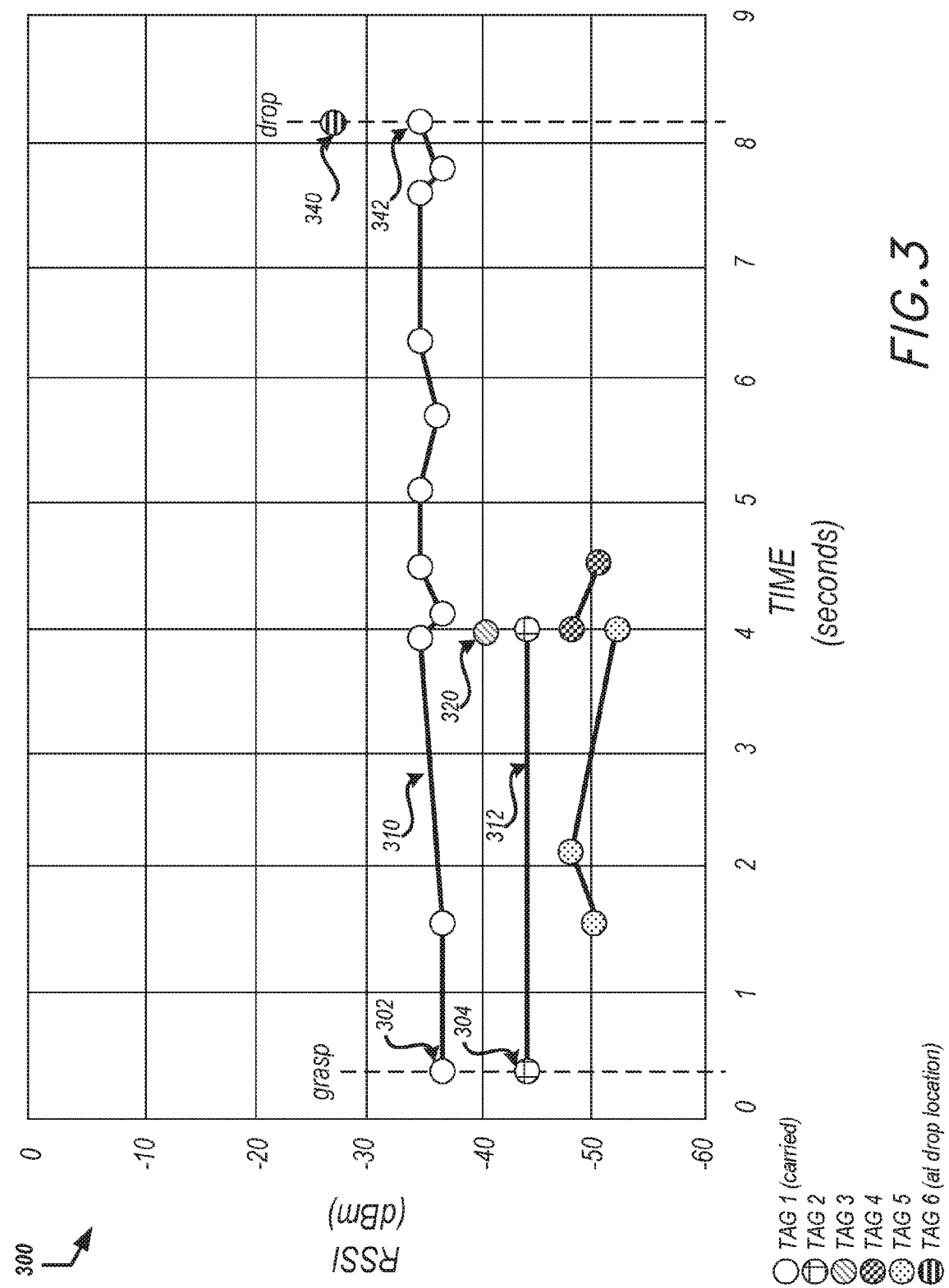
FIG. 3 is a plot diagram of example received signal strength indicators for several wireless identifiers over a period of time.

FIG. 3 is a plot diagram of example received signal strength indicators from several wireless identifiers over a period of time. The plot 300 shows example received signal strength indicator values expressed in decibel milliwatts (dBm) over a period of time expressed in seconds. The value may identify a power ratio of the measured power for the received signal referenced to one milliwatt. The plot 300 may be generated using the signal information received by the wireless scanning module 208.

The plot 300 shows collection of wireless identifiers when a grasp is detected. For a human, the grasp may be detected when a pressure sensor included on the wireless scanning device 200 detects the grip on an item. In a robotic implementation, the grasp may be detected upon completion of a step included in a task. For example, when the lift motor of a robot is engaged, the scanning may be activated. Two wireless identifiers (e.g., 302 and 304) may be detected at the grasp point. For purposes of the description of FIG. 3, identifier 302 is associated with TAG 1 which is associated with the carried item. Identifier 304 may be located within the scanning zone of the wireless scanning device, but not associated with the carried item. The wireless scanning device, at this stage, may not have yet determined which tag (e.g., TAG 1 or TAG 2) is associated with the item being carried. After collecting a set of wireless identifier signals the wireless scanning device may be able to make a positive determination as to the association between TAG 1 and the item being carried.

As time progresses, additional wireless identifiers may be detected. Some wireless identifiers are detected at multiple times but, perhaps, at different strengths. The RSSI values for respective wireless identifiers can be connected to provide a graph of the RSSI values over time. A graph 310 for TAG 1 includes readings from the time of grasp to the drop time. In contrast, a second graph 312 for TAG 2, include only points from the grasp until approximately 4 seconds.

This indicates that TAG 2 was near TAG 1 initially, but then the item associated with TAG 1 was moved away from TAG 2. The absence of TAG 2 at the drop time indicates that the item associated with TAG 2 is not present at the drop location. Read responses may not be received from all wireless identifiers for the full duration of time between grasp and drop. In some cases, only a single detection may be included. For example, TAG 3 was only detected at one point 320 and TAG 6 was only detected at one point 340 at the drop time.

Figure 4:
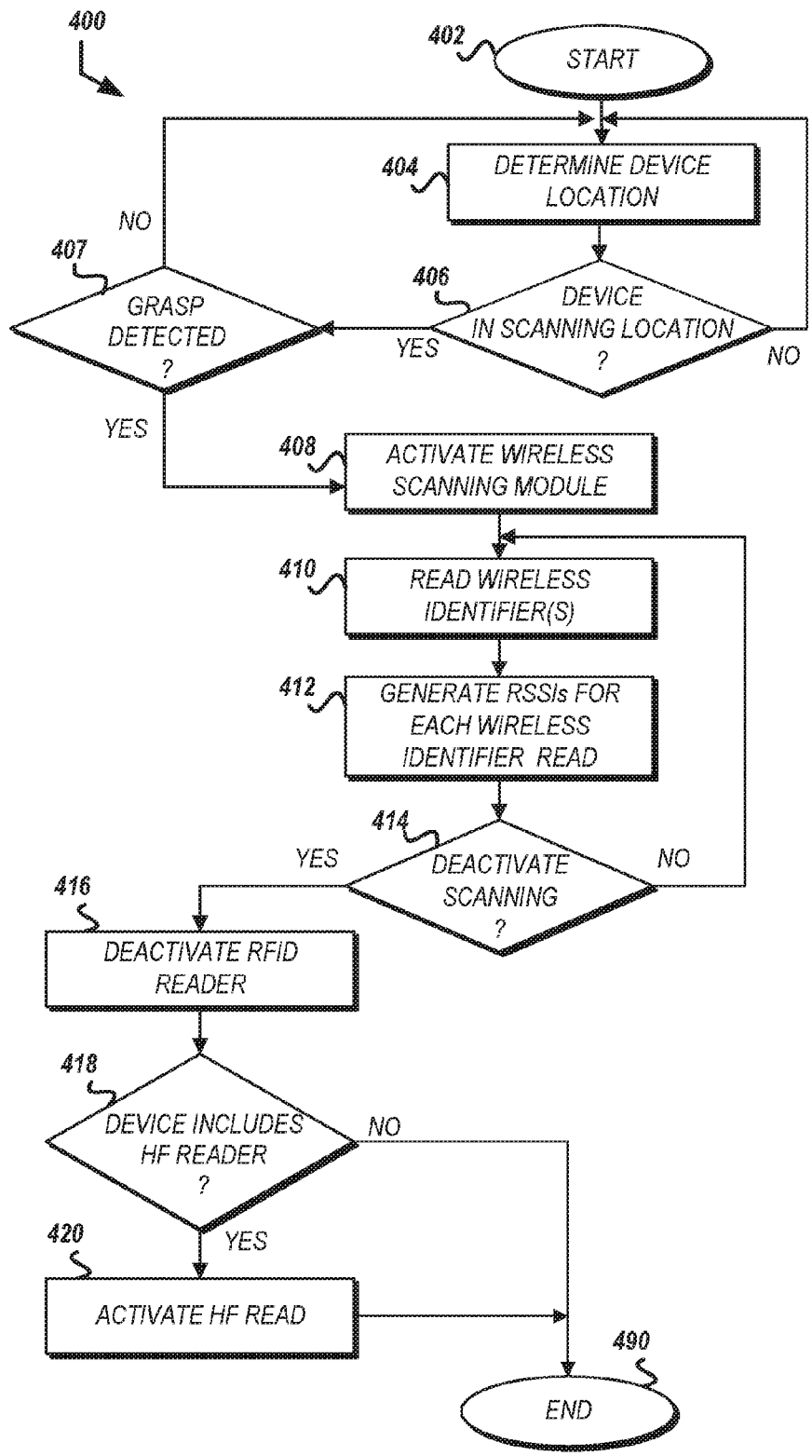
FIG. 4 is a flow diagram of an illustrative method of dynamic collection of received signal strength indicators.

FIG. 4 is a flow diagram of an illustrative method of dynamic collection of received signal strength indicators. The process 400 may collect the information that can be used to generate the plot 300 shown in FIG. 3. The process 400 may be implemented in whole or in part by the wireless scanning device 200. In some implementations, the wireless scanning device 200 may receive the signal information from wireless identifiers and transmit the received information to a management device or an item tracking system for further processing/analysis.

The process 400 begins at block 402. At block 404, the process 400 may determine the location of the wireless scanning device. Determining the location of the wireless scanning device may include receiving the location information from a real time location service such as an ultra-wideband real time location service. Determining the location may be based on messages transmitted from the wireless scanning device (e.g., from the wireless communication module 206). Using the network locations receiving the messages and/or signal characteristics associated with the message, the real time location system may identify the position of the wireless scanning device. In some implementations, the wireless scanning device may include a global positioning service transceiver to provide the location of the wireless scanning device.

At block 406, a determination may be made as to whether the device is located within a scanning location. For example, it may be desirable to scan when the device is located in areas of the workspace including items. A scanning area may be defined within which wireless identifier scanning can be activated. This helps avoid stray reads of wireless identifiers that are not associated with the workspace and conserve the resources of the wireless scanning device 200 for use within the workspace. If the determination at block 406 is negative, the process 400 may return to block 404 as described above.

If the determination at block 406 is affirmative, at block 407 a determination may be made as to whether a grasp or other interaction with the item is detected. The determination at block 407 may be used to conserve resources of the wireless scanning device 200. This can conserve resources needed to scan for wireless identifiers by activating the scanning when an item is being moved. The movement of an item may begin with grasping of the item to move.

As discussed above, in a robotic implementation, grasping may be identified when the robot completes a specific step in the assigned task. In a human or robot implementation, the determination may be based on a force sensor on a lifting surface (e.g., glove, finger, lifting platform) detecting a load that exceeds a force threshold value. In some implementations, the determination at block 407 may be based on a gesture. For example, in a glove implementation, adjacent fingers may be touched together to indicate the initiation of lifting. This touch may cause the activation of the wireless scanning module 208. As another example, the wireless scanning device 200 may include an accelerometer and when a specific hand motion is detected (e.g., a tapping pattern on the item to be grasped), initiate the wireless scanning module 208. The force threshold value and/or gesture may be specified in an item tracking configuration accessible by the wireless scanning device 200.

If the determination at block 407 is negative, the process 400 may return to block 404 as described above. The process 400 may include a delay before making a subsequent determination. The duration for the delay may be specified in an item tracking configuration accessible by the wireless scanning device 200. If the determination at block 407 is positive, the process 400 may proceed to block 408.

At block 408, the wireless scanning module of the wireless scanning device is activated. Activating the wireless scanning module may include turning on the wireless scanning module. Activating the wireless scanning module may include turning on specific scanners included in the wireless scanning module. Activating the wireless scanning module may include specifying a frequency to use for scanning. A microcontroller included in the wireless scanning device may determine which scanners to activate and the scanning frequency/frequencies to use based on the location of the wireless scanning device. For example, if the wireless scanning device is located in a section of the workspace 170 that stores items associated with particular wireless identifiers, the wireless scanning device may adjust the wireless scanning module to increase the sensitivity for the particular wireless identifiers. The frequency for scanning may be specified in an item tracking configuration accessible by the wireless scanning device 200.

At block 410, wireless identifiers within the scanning zone of the wireless scanning device may be read. The wireless identifiers may be read by the wireless scanning module activated at block 408. Reading the wireless identifiers may include transmitting a signal and receiving a response from one or more wireless identifiers within the scanning zone. The wireless scanning module may store the response in memory. Reading may also include identifying a characteristic of the response such as signal strength, phase (e.g., theta), or the like.

At block 412, received signal strength indicator values for each read wireless identifier may be generated. The values may be generated by the microcontroller of the wireless scanning device. In some implementations, the generating at block 412 may be performed by a server included in the inventory system such as a management device or an item tracking system. The received signal strength indicator value may be generated using the characteristics of the response. For example, a ratio of the power of the received signal to one milliwatt may be used as the RSSI value or included in a calculation to generate the RSSI value.

At block 414, a determination may be made as to whether to deactivate scanning. Deactivation may be based on the location of the wireless scanning device 200. For example, it may be desirable to deactivate scanning for wireless identifiers if the human wearing the wireless scanning device 200 leaves the workspace. When the human returns to the workspace, the scanning may be resumed. Additionally or alternatively, the determination at block 414 may be based on whether the grasp is released. Releasing the grasp indicates that the item being moved has been put down, presumably in the intended location. The determination at block 414 is an inverse of the determination made at block 404. For example, determining whether the grasp is released may be based on a force value detected by a force sensor is below a threshold. The determination may be based on detecting gesture (e.g., adjacent finger tap, hand waving, etc.) indicating placement of an item.

If the determination at block 414 is negative, the process 400 may return to block 410 to continue reading wireless identifiers. Because the item may not be at its final destination, the process 400 continues to collect wireless identifiers as described. If the determination at block 414 is positive, at block 416, the wireless scanning module that was activated at block 408 is deactivated. Deactivation may include turning the activated wireless scanning module off or into a low-power mode to conserve resources.

At block 418, a determination may be made as to whether the wireless scanning device, and particularly a wireless scanning module included in the wireless scanning device, includes a high frequency reader. A line of sight between the scanning device and wireless identifiers for items may be obstructed such as by a box, other items, or an inventory holder (e.g., bag or crate). The obstruction can cause degradation in the receiving responses from wireless identifiers. A high frequency reader may be used to read wireless identifiers affixed to obstructed items that may not have been detected using a UHF reader. If the wireless scanning device does not include a high frequency reader, the process 400 may end at block 490. If the wireless scanning device includes a high frequency reader, at block 420 the high frequency reader is activated to perform a high frequency scan for wireless identifiers. The wireless identifiers read at block 420 may be stored in a memory and/or transmitted from the wireless scanning device via the wireless communication module to another entity within the inventory system (e.g., management device or item tracking system). The activation at block 420 may be for a predetermined period of time (e.g., one second) thereby conserving the resources of the wireless scanning device. The period of time may be specified in an item tracking configuration accessible by the wireless scanning device 200. The process 400 may then end at block 490.

The process 400 may have collected information from multiple wireless identifiers. As shown in FIG. 3, six different wireless identifiers may be detected. In some inventory systems, however, the number of wireless identifiers detected may be hundreds or thousands of times greater than shown in FIG. 3. To ensure accurate tracking of a specific item, it may be desirable to identify a specific wireless identifier detected during a period of time to associate with an item (e.g., the item being moved).

Figure 5:
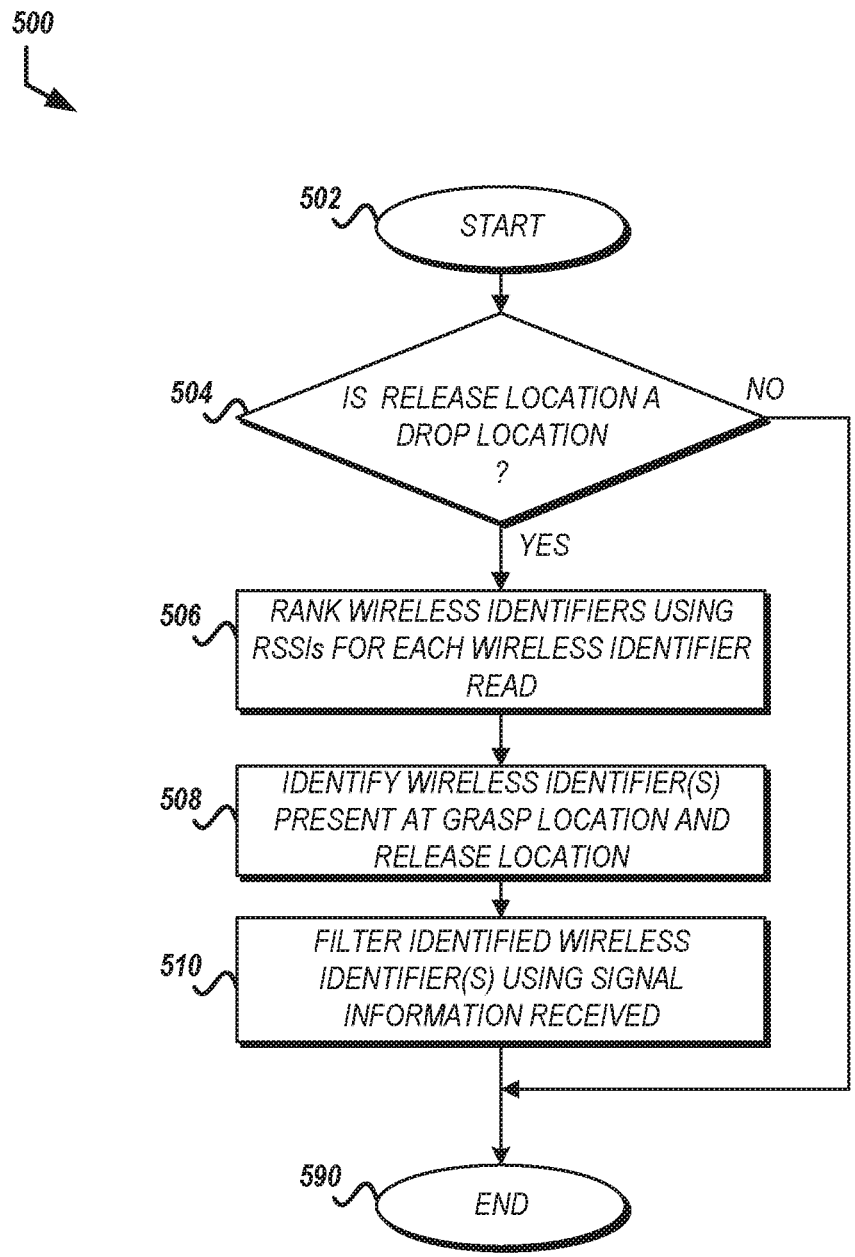
FIG. 5 is a flow diagram of an illustrative method of identifying wireless identifiers for a carried package based on received signal strength indicators.

FIG. 5 is a flow diagram of an illustrative method of identifying wireless identifiers for a carried package based on received signal strength indicators. The process 500 illustrates how the collected wireless identifier signal information can be analyzed to identify a specific wireless identifier associated with a carried item. The process 500 may be implemented in whole or in part by the wireless scanning device 200. In some implementations, the wireless scanning device 200 may receive a message from a server processing the signal information such as a management device or item tracking system.

The process 500 begins at block 502 with a set of collected signal information. The set of signal information may be collected using the process 400 shown and described with reference to FIG. 4. At block 504, a determination may be made as to whether the release location is a drop location. A drop location may be a specific location within the workspace where items can be dropped, such as an inventory station. A drop location may include a specific pallet, inventory holder, or other structure configured to receive an item. The determination at block 504 may include comparing the location of the wireless scanning device to known drop locations. The drop location may be specified when an entity accepts a task. In such implementations, the drop location may be provided in a message and stored by the wireless scanning device. In some implementations, the drop locations for a workspace may be stored in memory. The drop locations may be identified in an item tracking configuration accessible to the system processing the collected signals. The drop locations may be retrieved such as from a management device or item tracking system.

If the release location is not a drop location, the process 500 ends at block 590. Because this may be a momentary pause in the work, it may be desirable to wait until arrival at a drop location to being processing the item identifiers. One reason for a pause may be to allow a worker to make a stop to pick up a second item.

If the determination at block 504 is affirmative, at block 506, the process 500 may rank the wireless identifiers. The ranking may be based at least in part on the received signal strength identifiers generated for each wireless identifier. The ranking may be based on the number of successful reads of a wireless identifier. The ranking may be based on additional or alternative characteristics of the response signals received from the wireless identifiers.

At block 508, wireless identifiers present at both the grasp and release locations may be identified. This allows the process 500 to exclude the wireless identifiers read in passing. The identification may include comparing a timestamp associated with the read wireless identifier information. In some implementations, it may be desirable to establish a buffer such that wireless identifiers read within a certain time from the grasp and/or release may be included. This accounts for wireless identifiers that may not immediately respond to a scan such as due to an obstruction. The buffer may be specified in an item tracking configuration accessible by the device performing block 508.

Having narrowed the collected wireless identifiers to a set of identifiers that were present at or near the grasp location and at or near the drop location, at block 510, the set of identifiers may be further filtered to further reduce the number of possible wireless identifiers associated with the item being carried. One way the filtering at block 510 may be achieved is through the use of phase (e.g., theta) for each wireless identifier signal. The phase may generally be associated with a distance for the wireless identifier relative to the wireless scanning device. For a wireless identifier affixed to an item carried by an entity, the phase for each signal received from the wireless identifier should be relatively constant because the distance between the wireless identifier and wireless scanning module is relatively static. For a wireless identifier affixed to a non-carried item, the phase for each signal received will vary as the wireless scanning module approaches, enters, and then exits the area near the wireless identifier.

Filtering at block 510 may include excluding certain types of wireless identifiers. For example, wireless identifiers may transmit an identifier value. The identifier value may include a field indicating a type of item on which the wireless identifier is affixed. For example, a set of characters in an alphanumerical identifier value may indicate that a particular wireless identifier is associated with a mobile drive unit or inventory holder. The filtering at block 510 may identify only those wireless identifiers that are associated with items. At block 590, the set of filtered wireless identifiers should include those wireless identifiers that were carried and dropped.

Having accurately identified the carried wireless identifiers provides an indication of what was moved. In the processes described, active scanning may not be required to collect and analyze the wireless identifiers of items within the inventory system. This provides improvements in the collection and analysis of wireless identifiers in an inventory system. It may be desirable to perform additional processing to confirm that the item(s) moved were put in the proper location.

Figure 6:
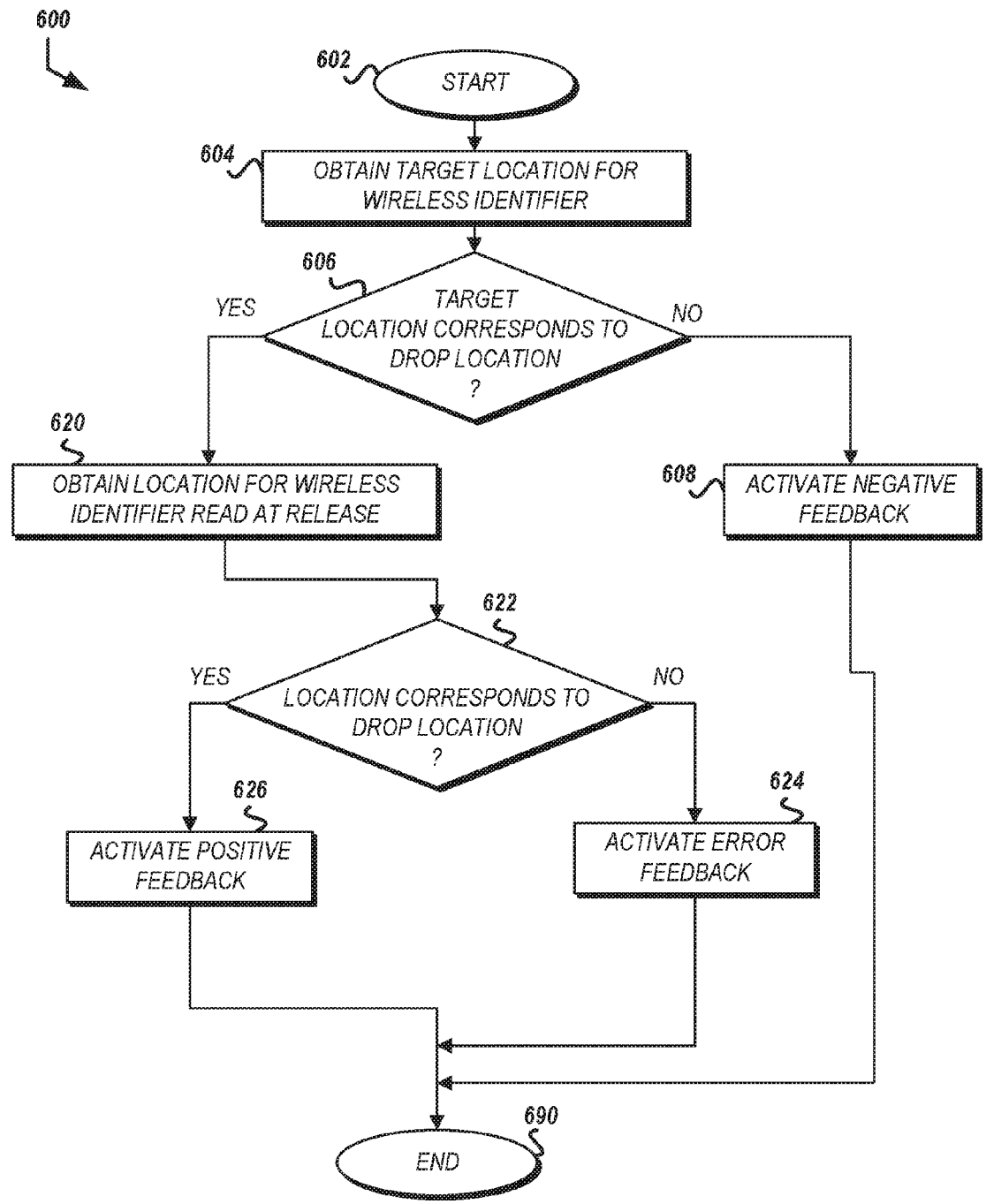
FIG. 6 is a flow diagram of an illustrative method of location verification and feedback using wireless identifiers.

FIG. 6 is a flow diagram of an illustrative method of location verification and feedback using wireless identifiers. The process 600 illustrates how an identified wireless identifier can be analyzed to confirm the proper location for an item associated with the wireless identifier. The process 600 may be implemented in whole or in part by the wireless scanning device 200. In some implementations, the wireless scanning device 200 may receive a message from a server processing the wireless identifier such as a management device or item tracking system.

The process begins at block 602. The process 600 assumes that a set of wireless identifiers is provided for items of interest (e.g., for location tracking) at a drop location. The set of wireless identifiers may be generated using the process 500 shown and described with reference to FIG. 5.

At block 604, a target location may be identified for the item identified by the wireless identifier. For example, the identification may include transmitting a request message to an item tracking system. The request message may include the identifier value transmitted by the wireless identifier. A message including the target location of the item may be provided in response to the request message. For example, the response message may include a location identifier for the target location for the item.

At block 606, a determination may be made as to whether the target location corresponds to the drop location. The correspondence may be based on a match between the target location and the drop location. In some implementations, a buffer distance (e.g., 1 foot, 2 feet, or 3 feet) may be included. In such implementations, the correspondence may be based on matching of the target location and the drop location within the buffer distance. For example, if the buffer distance is 2 feet and the drop location is 3 feet from the target location, the determination at block 606 may be negative.

When the determination at block 606 is negative, the process 600 may provide a negative feedback output at block 608. Providing a negative output may include displaying a message on the display of the wireless scanning device (e.g., "Improper Drop Location"). Providing negative output may include activating a vibration motor included in the wireless scanning device. The vibration motor may be activated at a speed and for a specified duration assigned to indicate incorrect item placement. Other examples of providing negative output may include playing audio or a tone associated with incorrect item placement. The output provided at block 608 may include additional or alternative perceivable outputs indicating incorrect item placement using an output device included in the wireless scanning device or operable to provide such output information in an area near the wireless scanning device (e.g., via a display system).

Returning to block 606, if the buffer distance is 2 feet and the drop location is 1.5 feet from the target location, the determination at block 606 may be affirmative. When the determination at block 606 is affirmative, the process 600 may proceed to block 620.

At block 620, a location of another wireless identifier read at or near the time when the carried item was dropped may be obtained. For example, as a human worker lowers an item, the wireless scanning device may receive read responses from wireless identifiers near the area where the item is being lowered. These additional reads may collect responses from a HF tag that is used to mark specific locations or tags from items or packages already at the destination. These additional reads appearing at the drop location can be used to further determine whether the location where the item was dropped is the target location.

Obtaining the location of the additional wireless identifier at block 620 may be implemented similar to the obtaining of location information described at block 604. For example, obtaining the location may include transmitting a request message to an item tracking system. The request message may include the identifier value transmitted by the additional wireless identifier. A message including the location associated with the additional wireless identifier may be provided in response to the request message. For example, the response message may include a location identifier for the location associated with the additional wireless identifier.

At block 622, a determination may be made as to whether the location of the additional wireless identifier corresponds to the drop location. Because the process 600 determined at block 622 that the drop location corresponds to the target location, in some implementations, the target location may be used as an alternative to or in addition to the drop location.

The determination at block 622 may be implemented in a similar fashion as the determination at block 606. For example, a match between the location of the additional wireless identifier's location and the drop location may be used. In some implementations, a buffer distance may be applied to allow for some discrepancy between the locations when determining correspondence.

Correspondence may also be based on characteristics of the items at the location. For example, using the identifiers for the items associated with the wireless identifiers, the process 600 may retrieve one or more characteristics of the items such as handling restrictions for the items. The characteristics may be stored in a catalog system or other information storage system. The characteristics may be compared using a compatibility rule. A compatibility rule may indicate what types of items may be located in the same or nearby locations. For example, it may be desirable to avoid placing a scented cleaning item near an edible item or a fragile item near an overweight item.

If the determination at block 622 is affirmative, the location of the item may be deemed correct. In such implementations, positive output may be activated at block 626. Providing a positive output may include displaying a message on the display of the wireless scanning device (e.g., "Drop Location Verified"). Providing positive output may include activating a vibration motor included in the wireless scanning device. The vibration motor may be activated at a speed and for a specified duration assigned to indicate proper item placement. Other examples of providing positive output may include playing audio or a tone associated with correct item placement. The output provided at block 626 may include additional or alternative perceivable outputs indicating correct item placement using an output device included in the wireless scanning device or operable to provide such output information in an area near the wireless scanning device (e.g., via a display system). Once provided, the process 600 may proceed to end at block 690.

Returning to block 622, if the determination is negative, the process 600 may proceed to block 624 to provide an error output. If the process 600 arrives at block 624, the location of the item may be confirmed with reference to the target location for the item, but the item may not be located in a proper location. For example, if the target location of the item is incorrect, the item may be placed in error. As another example, if the item associated with the additional wireless identifier is not located in the intended location, the process 600 may identify an error.

Providing an error output may include displaying a message on the display of the wireless scanning device (e.g., "Unable to Verify Location"). Providing error output may include activating a vibration motor included in the wireless scanning device. The vibration motor may be activated at a speed and for a specified duration assigned to indicate an error in item placement. Other examples of providing error output may include playing audio or a tone associated with erroneous item placement. The output provided at block 624 may include additional or alternative perceivable outputs indicating an error in item placement using an output device included in the wireless scanning device or operable to provide such output information in an area near the wireless scanning device (e.g., via a display system). Once provided, the process 600 may proceed to end at block 690. The output provided at block 624 may include transmitting an error report to the management device. The message may include the identifiers for the carried item and the item associated with the additional wireless identifier. This allows detection of errors within the inventory system with each carry action rather than identifying the error when an entity attempts to locate an item and fails to find it in the specified location.

Blocks 620, 622, and 624 may be omitted in some implementations of the process 600. For example, if the additional resources needed to perform the secondary location verification exceed the resources available for the location verification, the process 600 may, upon an affirmative determination at block 606, proceed to provide a positive feedback at block 626. Omitting blocks 620, 622, and 624 may be based on one or more resource thresholds. If the resources available are less than the threshold(s), blocks 620, 622, and 624 may be omitted. The resource thresholds may be specified in an item tracking configuration accessible by the device performing the process 600.

Figure 7:
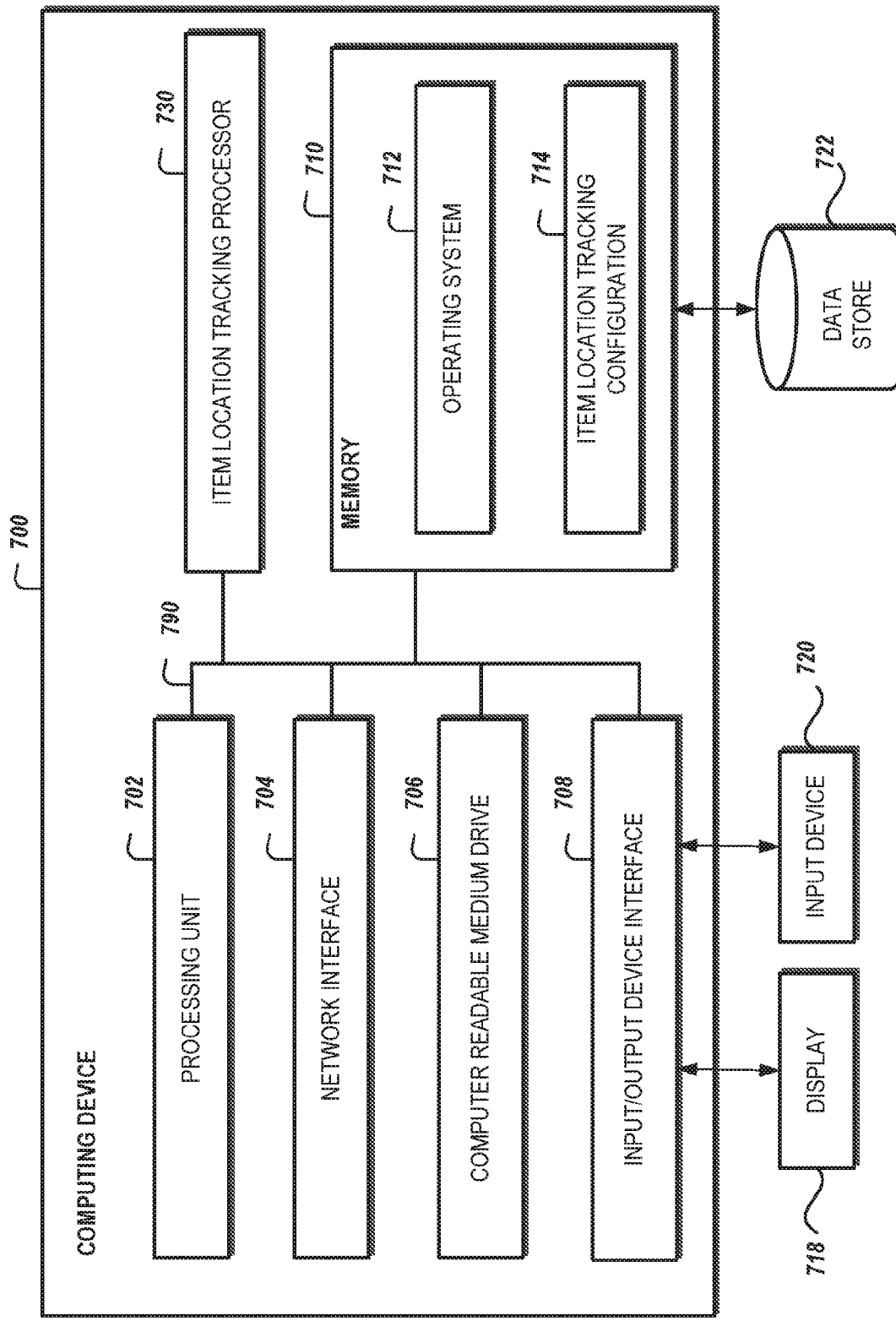
FIG. 7 is a functional block diagram of an example computing device for tracking item locations.

FIG. 7 is a functional block diagram of an example computing device for tracking item locations. The computing device 700 may be configured to execute some or all of the processes and embodiments described herein. For example, computing device 700 may be implemented by any device having a processor, including a telecommunication device, a cellular or satellite radio telephone, a laptop, tablet, or desktop computer, a digital television, a personal digital assistant (PDA), or by a combination of several such devices, including any in combination with a network-accessible server. The computing device 700 may be implemented in hardware and software using techniques known to persons of skill in the art. The disclosed processes for tracking item locations may alternatively be distributed across a system of two or more distinct computing devices.

The computing device 700 can include a processing unit 702, a network interface 704, a computer readable medium drive 706, an input/output device interface 708 and a memory 710. The network interface 704 can provide connectivity to one or more networks or computing systems. The processing unit 702 can receive information and instructions from other computing systems or services via the network interface 704. The network interface 704 can also store data directly to memory 710. The processing unit 702 can communicate to and from memory 710. The input/output device interface 708 can accept input from the optional input device 720, such as a keyboard, mouse, digital pen, microphone, camera, etc. In some embodiments, the optional input device 720 may be incorporated into the computing device 700. Additionally, the input/output device interface 708 may include other components including various drivers, amplifiers, preamplifiers, front-end processor for speech, analog to digital converters, digital to analog converters, etc.

The memory 710 may contain computer program instructions that the processing unit 702 executes in order to implement one or more embodiments. The memory 710 generally includes RAM, ROM and/or other persistent, non-transitory computer-readable media. The memory 710 can store an operating system 712 that provides computer program instructions for use by the processing unit 702 in the general administration and operation of the computing device 700. The memory 710 can further include computer program instructions and other information for implementing some or all of the features described. For example, in one embodiment, the memory 710 includes an item tracking configuration 714 that provides configuration values to adjust the state of the computing device 700 to track the location of items. For example, the item tracking configuration 714 may identify how often to read wireless identifiers, frequencies to use for reading wireless identifiers, thresholds for detecting lifting/dropping of an item, locations where scanning should be activated/deactivated, frequencies for scanning particular locations, and other information to support the tracking of item locations. An item location tracking processor 730 may be included in the computing device 700 to coordinate the item location tracking. The item location tracking processor 730 may be configured to perform the processes such as the process 400 shown in FIG. 4, the process 500 shown in FIG. 5, and/or the process 600 shown in FIG. 6.

The memory 710 may also include or communicate with one or more auxiliary data stores, such as a data store 722. The data store 722 may electronically store data regarding item location tracking such as wireless identifiers, wireless identifier read responses, wireless identifier read response signal characteristics, and the like. A bus 790 may be included in the computing device 700 to allow the elements included in the computing device 700 to exchange data (e.g., messages).

In some embodiments, the computing device 700 may include additional or fewer components than are shown in FIG. 7. For example, a computing device 700 may include more than one processing unit 702 and computer readable medium drive 706. In another example, the computing device 700 may not include or be coupled to an input device 720, include a network interface 704, include a computer readable medium drive 706, include an operating system 712, or include or be coupled to a data store 722. In some embodiments, two or more computing devices 700 may together form a computer system for executing features of the present disclosure. Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations, or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a mobile drive unit, management device, or other hardware included in an inventory system. The mobile drive unit, management device, or other hardware included in an inventory system may include a digital signal processor (DSP), an application specific integrated circuit (ASIC), a field programmable gate array (FPGA), a microprocessor, a controller, microcontroller, or other programmable logic element, discrete gate or transistor logic, discrete hardware components, or any combination thereof. Devices used to implement the inventory system are specially designed to perform the item location tracking features described herein. One or more of the devices included in the inventory system may include electrical circuitry configured to process specific computer-executable to perform one or more of the features described herein. In embodiments where a device includes a FPGA or similar programmable elements, the inventory system (or a device included therein) may provide one or more of the features described processing without processing computer-executable instructions but instead by configuring the FPGA or similar programmable element to perform the recited features. Although described herein primarily with respect to digital technology, aspects of the inventory system may also include primarily analog components. For example, some or all of the item location tracking features described herein may be implemented in analog circuitry or mixed analog and digital circuitry.

The elements of a method, process, routine, or algorithm described in connection with the embodiments disclosed herein can be embodied directly in inventory system hardware, in a software module executed by one or more devices included in the inventory system, or in a combination of the two. A software module can reside in RAM memory, flash memory, ROM memory, EPROM memory, EEPROM memory, registers, hard disk, a removable disk, a CD-ROM, or similar form of a non-transitory computer-readable storage medium. An illustrative storage medium can be coupled to the inventory system such that the inventory system (or a device included therein) can read information from, and write information to, the storage medium. In the alternative, the storage medium can be integral to the inventory system or device having a need therefor.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output indicating the result of the generating. The combination may be dynamically performed such as through dynamic selection of execution paths based on, for example, the input information, device operational characteristics (e.g., hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

As used herein, "activate" or "activating" may refer to causing or triggering a mechanical, electronic, or electromechanical state change to a device. Activation of a device may cause the device, or a feature associated therewith, to change from a first state to a second state. In some implementations, activation may include changing a characteristic from a first state to a second state such as, for example, enabling or disabling a component of the wireless scanning device or changing an operational characteristic of a component such as the frequency emitted by the wireless scanning device. Activating may include generating a control message indicating the desired state change and providing the control message to the device to cause the device to change state.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

The invention claimed is:
1. A computer-implemented method comprising:
under control of a first computing device executing specific computer-executable instructions,
detecting, via a force sensor included in a wireless scanning device, a first force value greater than a threshold, the first force value indicating that an item is moved;
transmitting wireless identifier read requests while the first force value is greater than the threshold;
receiving wireless identifier read responses, each wireless identifier read response including an identifier for a wireless identifier that transmitted the wireless identifier read response;
generating a signal strength indicator for each wireless identifier read response;
detecting, via the force sensor, a second force value less than the threshold; and
identifying a first wireless identifier affixed to the item using the wireless identifier read responses and signal strength indicators for respective wireless identifier read responses.

2. The computer-implemented method of claim 1, further comprising:
determining a current location for the wireless scanning device;
determining a destination location for the item identified by the first wireless identifier using the identifier included in a wireless identifier read response from the first wireless identifier; and
displaying a first message on a display included in the wireless scanning device, the first message indicating that the current location corresponds to the destination location.

3. The computer-implemented method of claim 1, further comprising:
determining, via a real time location service, a location for a second wireless identifier read within a period of time from the detecting of the second force value, the determining based at least in part on a second identifier included in a second wireless identifier read response received from the second wireless identifier;
determining a destination location for the item identified by the wireless identifier using the identifier included in a wireless identifier read response from the wireless identifier; and
displaying a first message on a display included in the wireless scanning device, the first message indicating that the location of the second wireless identifier corresponds to the destination location.

4. The computer-implemented method of claim 1, further comprising:
identifying a first set of wireless identifier read responses from wireless identifiers received within a first threshold time from the detecting of the first force value;
identifying a second set of wireless identifier read responses from wireless identifiers received within a second threshold time from the detecting of the second force value;
ranking the first set of wireless identifiers and the second set of wireless identifiers based at least in part on the signal strength indicators associated with each wireless identifier, wherein responses from the first wireless identifier identifying the item are included in the first set of wireless identifier read responses and in the second set of wireless identifier read responses, and wherein a first signal strength indicator for a first wireless identifier read response for the first wireless identifier included in the first set corresponds to a second signal strength indicator for a second wireless identifier read response for the first wireless identifier included in the second set.

5. A computer-implemented method comprising:
under control of a first computing device executing specific computer-executable instructions,
detecting that an item is moved based at least in part on a first value generated by a sensor included in a wireless scanning device;
transmitting wireless identifier read requests;
receiving wireless identifier read responses, each wireless identifier read response including an identifier for a wireless identifier that transmitted the wireless identifier read response;
generating a plurality of metrics, wherein each metric in the plurality of metrics characterizes a property of a signal carrying one of the wireless identifier read responses;
detecting, via the sensor, a second value indicating that the item is released; and
attributing a first wireless identifier to the item using the wireless identifier read responses and the plurality of metrics for respective wireless identifier read responses.

6. The computer-implemented method of claim 5, further comprising:
determining a current location for the wireless scanning device;
determining a destination location for the item identified by the first wireless identifier using the identifier included in an wireless identifier response from the first wireless identifier; and
producing a perceivable output from the first computing device, the perceivable output indicating that the current location corresponds to the destination location.

7. The computer-implemented method of claim 5, further comprising:
determining a location for a second wireless identifier read within a period of time from the detecting of the second value, the determining based at least in part on a second identifier included in a second wireless identifier response received from the second wireless identifier;
determining a destination location for the item identified by the first wireless identifier using the identifier included in a wireless identifier response from the first wireless identifier; and
producing a perceivable output from the wireless scanning device, the perceivable output indicating that the location of the second wireless identifier corresponds to the destination location.

8. The computer-implemented method of claim 5, further comprising:
identifying a first set of wireless identifier read responses from wireless identifiers received within a first threshold time from the detecting of the first value;
identifying a second set of wireless identifier read responses from wireless identifiers received within a second threshold time from the detecting of the second value; and
ranking the first set of wireless identifiers and the second set of wireless identifiers based at least in part on the metrics associated with each wireless identifier, wherein responses from the first wireless identifier attributed to the item are included in the first set of wireless identifier read responses and in the second set of wireless identifier read responses, and wherein a first metric of the plurality of metrics for a first wireless identifier read response for the first wireless identifier included in the first set corresponds to a second metric of the plurality of metrics for a second wireless identifier read response for the first wireless identifier included in the second set.

9. The computer-implemented method of claim 5, wherein the plurality of metrics comprise a signal strength indicator, the signal strength indicator based at least in part on a ratio between a power level for the signal carrying the respective wireless identifier read response and a reference power level.

10. The computer-implemented method of claim 5, wherein the computer-implemented method further comprises:
determining that a first location of the wireless scanning device is outside a scanning area;
deactivating a transmitter used to transmit the wireless identifier read requests;
determining that a second location of the wireless scanning device is within the scanning area; and
activating the transmitter used to transmit the wireless identifier read requests.

11. The computer-implemented method of claim 5, wherein the sensor comprises a force sensor, and wherein the computer-implemented method further includes receiving a force value from the force sensor, the force value indicating a force applied with reference to the item, and wherein the first value comprises the force value.

12. The computer-implemented method of claim 5, wherein the first wireless identifier is at least one of a near field communication device or a radio frequency identification device.

13. A system comprising:
a data store storing specific computer-executable instructions; and
a first computing device in communication with the data store, the computing device including a processor that executes the specific computer-executable instructions to cause the system to at least:
receive a first value from a passively activated switch, the first value indicating at least one of: a first interaction with an item, and a location of the interaction;
transmit wireless identifier read requests;
receive wireless identifier read responses, each wireless identifier read response including an identifier for a wireless identifier that transmitted the wireless identifier read response;
generate a plurality of metrics, wherein each metric in the plurality of metrics characterizes a property of a signal carrying one of the wireless identifier read responses;
receive a second value from the passively activated switch, the second value indicating a second interaction with the item; and
attribute a first wireless identifier to the item using the wireless identifier read responses and the plurality of metrics for respective wireless identifier read responses.

14. The system of claim 13, wherein the specific computer-executable instructions further cause the system to at least:
determine a current location for a wireless scanning device including the passively activated switch;

determine a destination location for the item identified by the first wireless identifier using the identifier included in an wireless identifier response from the first wireless identifier; and produce a perceivable output indicating that the current location corresponds to the destination location.

15. The system of claim 13, wherein the specific computer-executable instructions further cause the system to at least:

determine a location for a second wireless identifier read within a period of time from the detecting of the second value, the determining based at least in part on a second identifier included in a second wireless identifier response received from the second wireless identifier;

determine a destination location for the item identified by the first wireless identifier using the identifier included in an wireless identifier response from the first wireless identifier; and produce a perceivable output indicating that the location of the second wireless identifier corresponds to the destination location.

16. The system of claim 13, wherein the specific computer-executable instructions further cause the system to at least:

identify a first set of wireless identifier read responses from wireless identifiers received within a first threshold time from the detecting of the first value;

identify a second set of wireless identifier read responses from wireless identifiers received within a second threshold time from the detecting of the second value; and rank the first set of wireless identifiers and the second set of wireless identifiers based at least in part on the metrics associated with each wireless identifier, wherein responses from the first wireless identifier attributed to the item are included in the first set of wireless identifier read responses and in the second set of wireless identifier read responses, and wherein a first metric of the plurality of metrics for a first wireless identifier read response for the first wireless identifier included in the first set corresponds to a second metric of the plurality of metrics for a second wireless identifier read response for the first wireless identifier included in the second set.

17. The system of claim 13, wherein the plurality of metrics comprise a signal strength indicator, the signal strength indicator based at least in part on a ratio between a power level for the signal carrying the respective wireless identifier read response and a reference power level.

18. The system of claim 13, wherein the read requests are transmitted at a first frequency, and wherein the specific computer-executable instructions further cause the system to at least:

in response to detecting the second value, transmit an additional wireless identifier read request at a second frequency, wherein the second frequency is different than the first frequency, and wherein an additional wireless identifier read response is received in response to the additional wireless identifier read request is used to attribute the wireless identifier.

19. The system of claim 13, wherein the passively activated switch comprises an accelerometer, and wherein the specific computer-executable instructions further cause the system to at least receive, from the accelerometer, motion input data indicating a gesture, and wherein the first value comprises the motion input data.

20. The system of claim 19, wherein the specific computer-executable instructions further cause the system to determine that the gesture corresponds to a predetermined lifting gesture.

* * * * *